May 12, 1964  H. O. HAISSIG ET AL  3,132,428
LEVELING DEVICE
Filed Jan. 12, 1962  2 Sheets-Sheet 1

INVENTORS
HAROLD O. HAISSIG
BY RAYMOND R. HAISSIG

*Willis B. Swartwout III*
ATTORNEY

May 12, 1964  H. O. HAISSIG ET AL  3,132,428
LEVELING DEVICE
Filed Jan. 12, 1962  2 Sheets-Sheet 2

INVENTORS
HAROLD O. HAISSIG
RAYMOND R. HAISSIG
BY
Willis B. Swartwout III
ATTORNEY

United States Patent Office 3,132,428
Patented May 12, 1964

3,132,428
LEVELING DEVICE
Harold O. Haissig and Raymond R. Haissig, both of Milwaukee, Wis., assignors to Haissig, Inc., Milwaukee, Wis., a corporation of Wisconsin
Filed Jan. 12, 1962, Ser. No. 165,747
12 Claims. (Cl. 33—209)

The present invention relates to leveling devices, and more particularly to a leveling device which will determine relative levelness of remote points.

It is an object of the present invention to provide a device of the character described, which includes translucent or transparent containers provided with relatively identical graduations and a hydraulic line interconnecting the containers such that fluid in the lines and containers will indicate on said graduations relative levelness of remote points.

It is another object of the present invention to provide a device of the character above described equipped with valve mechanism adapting the device for easy filling and draining.

It is still another object of the present invention to provide a device of the character described wherein the valve mechanism includes structure for simply controlling liquid flow during manipulation of the device.

It is manifest to anyone familiar with the art, that leveling devices employing liquid as an actuating means are difficult to control during their movement form one location to the other, and it is the prime object of our invention to provide a device that may be manually controlled to permit filling it with liquid or draining it, and to retain the liquid in proper position for reading, and controlling the liquid while the assembled device is transported from one location to another.

Further objects and advantages of the present invention will become apparent as this description proceeds, as will various modifications and changes which can be made to the structure of the device without departing from the spirit of the present invention. Such additional objects, advantages, modifications and changes are intended to be covered by the scope of the appended claims.

Figure 1:
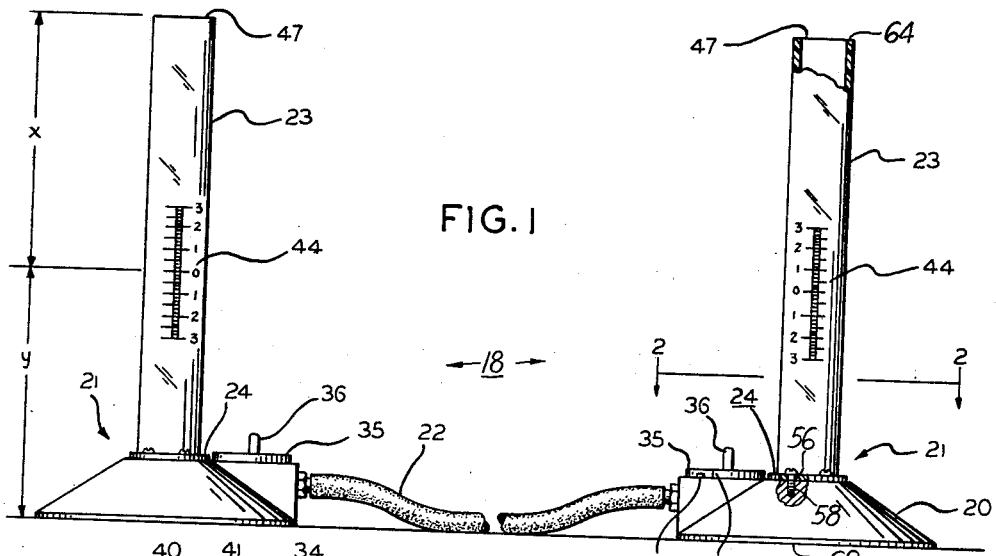
FIGURE 1 is a side elevational view of the present invention, with portions broken away to show details of construction.
Figure 3:
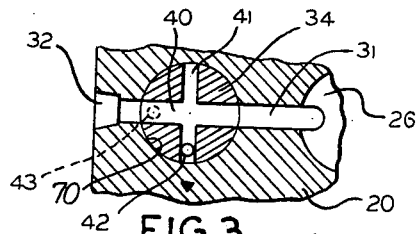
FIG. 3 is a fragmentary horizontal cross-sectional view of a portion of a unit of the subject invention in its relation to a rotatably mounted control valve showing the valve in one of a plurality of positions thereof.
Figure 4:
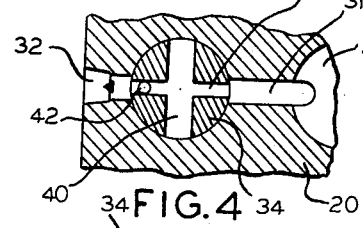
FIG. 4 is a view similar to FIG. 3, showing said valve in a second position.
Figure 5:
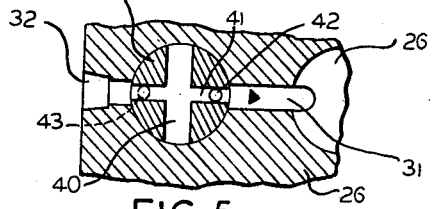
FIG. 5 is a view similar to FIGS. 3 and 4, showing said valve in a third position.
Figure 6:
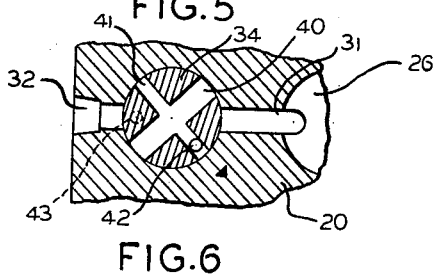
FIG. 6 is a view similar to FIGS. 3, 4 and 5, showing said valve in a fourth position.
Figure 2:
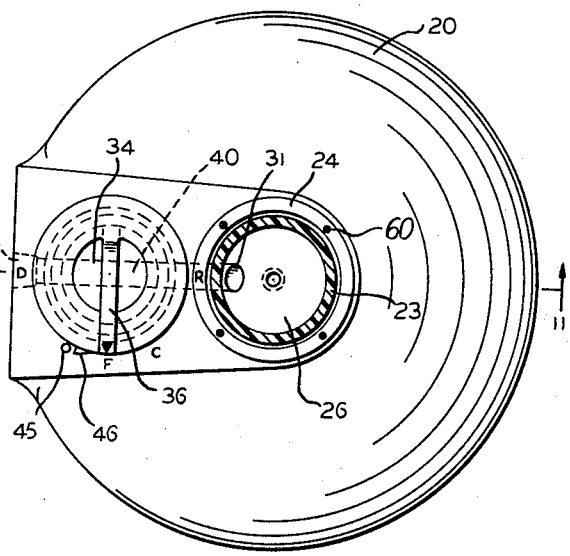
FIG. 2 is a view taken along line 2—2 of FIG. 1 looking in the direction of the arrows.
Figure 7:
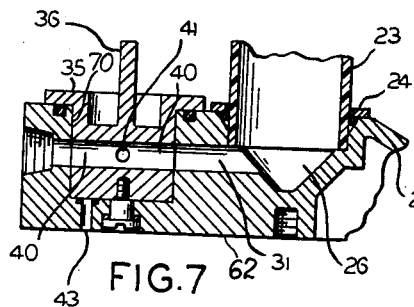
FIG. 7 is a vertical fragmentary cross-sectional view of a portion of a unit showing the vertical relationship of the unit to the valve, which is in the same position as in FIG. 3.
Figure 8:
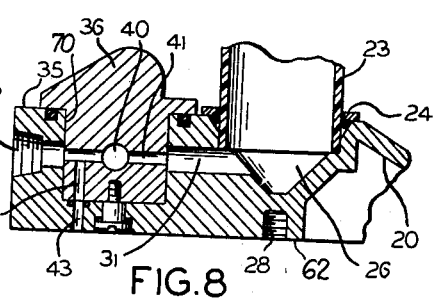
FIG. 8 is a view similar to FIG. 7, showing the relationship when the valve is in the same position as in FIG. 4.
Figure 9:
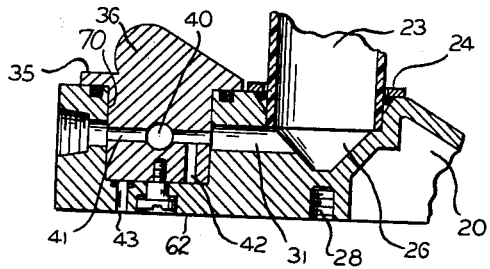
FIG. 9 is a view similar to FIGS. 7 and 8, showing the relationship when the valve is in the same position as in FIG. 5.
Figure 10:
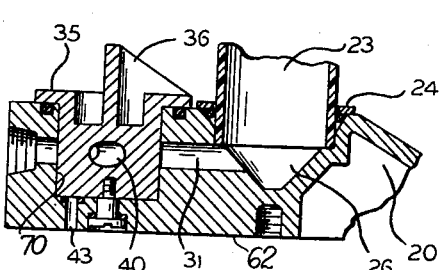
FIG. 10 is a view similar to FIGS. 7, 8 and 9, showing the relationship when the valve is in the same position, as in FIG. 6.
Figure 11:
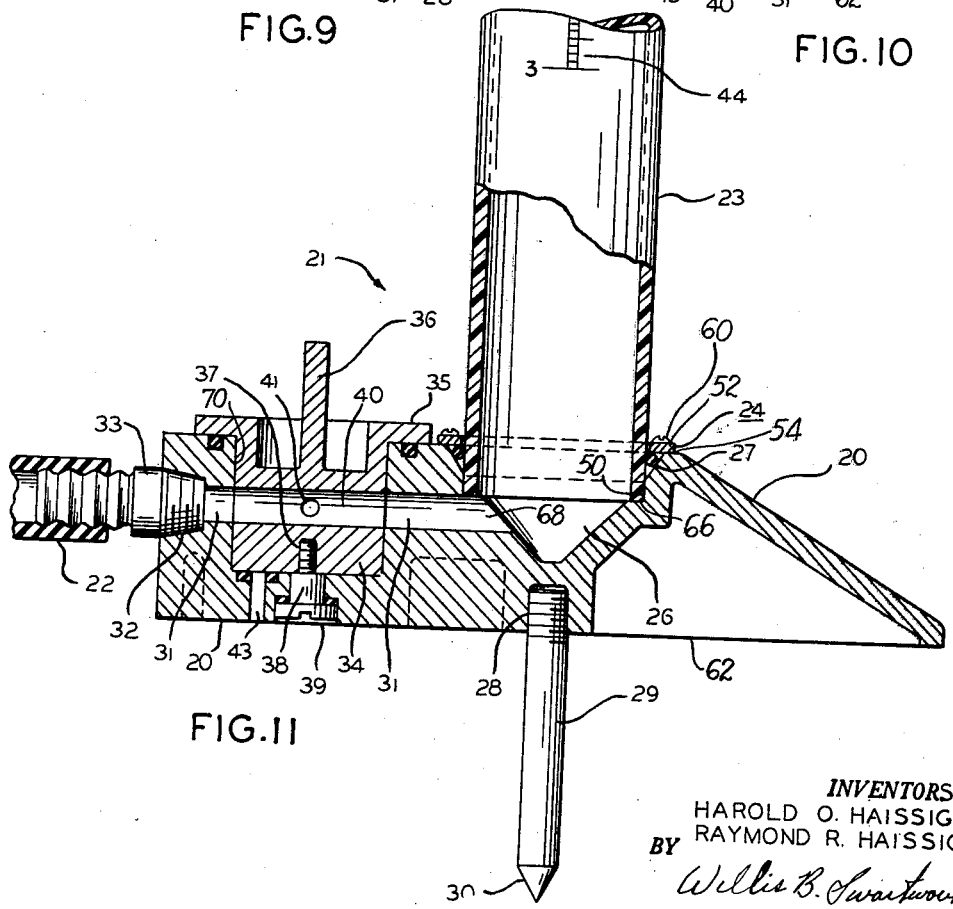
FIG. 11 is a vertical cross-sectional view of one of the units of the present invention taken along line 11—11 of FIG. 2 looking in the direction of the arrows.

Referring now to the drawings and more particularly to FIG. 1, the device of the present invention is generally designated by the numeral 18 and includes a pair of container units 21 interconnected by a hydraulic tube 22. Containers 21 include a base 20 and a tubular member 23 provided with margins 64 and 66 at either end, which lie in level parallel planes, which may be either translucent or transparent and made from substances such as glass or plastic, said tubular members being open at either end, base 20 and one end of member 23 being joined by a sealed joint generally designated by numeral 24.

The construction of joint 24 is relatively simple but effective. Base 20 is provided with an aperture having a tapered wall 26 for receiving member 23. A groove 50 is cut in wall 26 to receive and support one end of member 23. A ring 52 surrounds member 23 and rests on base 20 at the margin 54 of the aperture formed by wall 26. Ring 52 is provided with openings 56 through which a screw may pass and margin 54 is provided with threaded passageways 58 to receive screws. A pliable washer 27 made of rubber, composition or other similar material is inserted in the aperture to contact wall 26, the outwardly facing surface of member 23, and the downwardly facing surface of ring 52. Screws 60 are passed through openings 56 and threadably engaged with passageways 58. As screws 60 are threadably advanced into passageways 58, ring 52 is drawn down on washer 27, deforming the latter and causing it to be pressed against the outwardly facing surface of member 23 and against wall 26 to provide a liquid and air tight sealed joint between member 23 and base 20.

The base 20 is shown provided with a level bottom surface 62 which is to accommodate a threaded peg 29 shown tapered to a point 30. The purpose of the peg 29 being to support the unit 21 when it is applied to a surface such as soil, or the like, and its threaded engagement with the base 20 permits removing the peg when the unit rests on a hard flat surface.

A pair of coaxial tubular passageways 31 and 68 extend through base 20, passageway 68 from the center aperture defined by wall 26 to a valve aperture 70, and passageway 31 from aperture 70 to the outer threaded opening 32, which accommodates a ferrule 33, adapted to receive one end of member 22, leading from one unit 21 to the other.

Aperture 70 is cylindrical to receive a revolvable generally cylindrical control valve stem 34, provided with a flange 35 at one end and valve 34 also has an upwardly extending blade 36 at the same end for its manipulation.

The end of the control valve 34 remote from blade 36 is provided with a threaded aperture 37 to threadably receive and engage a screw 38, extending upwardly through the base 20 and having its head disposed within a recess 39 provided in the bottom surface of the base 20 for this purpose.

The control valve 34 is further provided with a pair of intersecting cylindrical passageways 40 and 41 lying at right angles to one another but in the same plane, and in the same plane as passageways 31 and 68. Passageways 40 and 41 extend across the entire diameter of valve stem 34. Passageway 40 is of a diameter equal to the diameter of passageways 31 and 68 in base 20. Passageway 41 is of a diameter substantially less than the diameter of passageway 40, such that when it is coaxially aligned with passageways 31 and 68 by manipulation of valve stem 34, passageway 41 becomes a restricting orifice.

The control valve 34 also has a vertical passageway 42 extending downwardly from one end of passageway 41 to the end of valve stem 34 remote from blade 36. Base 20 is provided with a drain passageway 43 extending from valve aperture 70 downwardly through base 20 to an opening in level bottom surface 62. Manipulation of valve 34 will align passageways 41 and 43 in one position of said valve 34.

The assembled device consists of a pair of units 21, joined by a tube 22. The members 23 are equipped with graduations shown as 44, etched or otherwise designated on their outer surface. The graduations are equally spaced from each other and the central graduation is the level point. The graduations are numbered progressively higher as they increase in distance from the level point shown in the drawings as zero. The zero point is exactly halfway between surface 62 and margin 64 of member 23.

Referring now to FIGS. 3 through 6 and FIGS. 7 through 10, it will be obvious that when the device 18 is to be filled, the valve 34 is manipulated to coaxially align passageway 40 with passageways 31 and 68 in each unit 21, allowing free flow of liquid between the units. When it is desired to drain the device 18, valve 34 is manipulated to align vertical passageway 42 with drain passageway 43, permitting restricted flow between units 21 through passageway 41, which is coaxially aligned with passageways 31 and 68, and drain through aligned passageways 42 and 43. When it is desired to use the device 18 for leveling, passageway 41 is coaxially aligned with passageways 31 and 68 with passageways 42 and 43 ninety degrees out of alignment, or in other words, with the end of passageway 41 opening into passageway 42 as remote as possible from drain passage 43. Flow being restricted through passageway 41 enables the user of device 18 to more quickly obtain an accurate reading of levelness. When transporting the device 18, valve 34 of each unit 21 is manipulated to a position in which both passageways 41 and 42 are out of alignment with passageways 31 and 68, and passageway 42 therefore cannot register with passageway 43. Liquid in tube 22 is trapped. Members 23 can be inverted and emptied and the device transported freely without danger of leakage.

In order to establish a fixed position of the control valve 34, while the assembly is being transported or moved, we show a pin 45, extending upwardly from the base 20 and a projecting flange 46 extends outwardly from the flange 35 for contact with the pin 45.

It will be further obvious that since margins 64 of tubes 23 lie in a level plane, the device 18 may be used with equally excellent results to determine relative levelness between remote points on a ceiling as on a floor or ground surface.

Having thus described the invention, what is claimed and desired to be secured by Letters Patent in the United States is:

1. A leveling device including a pair of containers each having a base, an upwardly extending transparent tubular member provided with graduations and means for connecting said base to said member in a sealed joint; a hydraulic tube interconnecting said bases; a drain passageway in each of said bases; and fluid flow control valve means in each of said bases connecting to the tube, tubular member and drain passageway, said fluid flow control valve means having a plurality of intersecting passageways and being movable between a plurality of positions including a first position connecting said tube and said tubular member for restricted flow of fluid therebetween, a second position connecting said tube and said tubular member for free flow therebetween and connecting said tube and said tubular member with said drain passage, a third position connecting said tube and said tubular member through a restricted fluid passage for restricted fluid flow therebetween and a fourth position blocking said tube and tubular member from fluid flow therebetween and blocking said tube and said tubular member from said drain passage.

2. The device as set forth in claim 1 wherein said means for connecting said base and said member include a tubular member receiving aperture having a tapered wall on said base, a ring having openings therein surrounding said member over said aperture, threaded passages in said base, a pliable washer in said aperture under said ring, and threaded screws inserted through the openings in said ring and threaded into said threaded passages whereby as said screws are advanced into said threaded passages said ring compresses between said tapered aperture walls and said tube to provide a sealed joint.

3. The device as set forth in claim 2 wherein said valve means further includes coaxial passageways in said base from said tube to said valve and from said valve to said aperture.

4. The device as set forth in claim 3 wherein said base has at least one level surface.

5. The device as set forth in claim 3 wherein said tubular member is open at the end thereof remote from said base and the margin of said tube at said open end thereof lies in a level plane.

6. The device as set forth in claim 3 wherein said base has at least one level surface, and said tubular member is open at the end thereof remote from said base and the margin of said tube at said open end thereof lies in a level plane.

7. The device as set forth in claim 6 wherein the graduations on said tube include a central median point denoting the exact median point between the level surface of said base and margin of said tube lying in a level plane.

8. The device as set forth in claim 7 wherein said graduations further include markings running in opposite directions from said median point and spaced equi-distantly from each other.

9. The device as set forth in claim 3 wherein said base is further provided with a cylindrical valve receiving opening and said valve means further includes a cylindrical valve stem having a manually manipulable blade at one end and provided with a pair of intersecting passageways therethrough whose axes lie in the same plane and are offset from each other ninety degrees, one of said passageways being greater in cross sectional area than the other, and a third passageway connecting at one end with one end of the passageway of said first two passageways that is of smaller cross sectional area and terminating at the end of said stem remote from said blade whereby in one position of said valve stem said third passageway will register with said drain passage.

10. The device as set forth in claim 9 wherein said pair of intersecting passageways lie in the same horizontal plane.

11. The device as set forth in claim 9 wherein said base is provided with a threaded opening in the level surface thereof and a peg threaded at one end and tapered to a point at the opposite end is threadably engaged with said base whereby said device may be securely anchored in the ground.

12. The device as set forth in claim 9 wherein said valve stem protrudes above said base at the blade end thereof and has a peripheral flange extending over said base and resting thereon, said flange having a projecting member, and said base having an upwardly extending pin at the outer peripheral edge of said flange whereby when said stem is rotated said projecting member engages said pin to limit rotational movement of said stem and to denote that position of said valve in which all fluid flow is blocked.

References Cited in the file of this patent

UNITED STATES PATENTS

| | | |
|---|---|---|
| 1,566,174 | Tyler | Dec. 15, 1925 |
| 1,576,470 | Richardson | Mar. 9, 1926 |
| 1,599,347 | Purkey | Sept. 7, 1926 |
| 2,566,102 | Waldo | Aug. 28, 1951 |